(12) United States Patent
Hong et al.

(10) Patent No.: US 8,451,125 B2
(45) Date of Patent: May 28, 2013

(54) READER BASED ON RFID

(75) Inventors: Jin Kuk Hong, Hwaseong (KR); Jeong Ki Ryoo, Anyang (KR); Jae Yul Choo, Seongnam (KR); Hyung Jun Jeon, Hwaseong (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 483 days.

(21) Appl. No.: 12/907,784

(22) Filed: Oct. 19, 2010

(65) Prior Publication Data

US 2011/0095892 A1    Apr. 28, 2011

(30) Foreign Application Priority Data

Oct. 27, 2009   (KR) .......................... 10-2009-0102255

(51) Int. Cl.
  *G08B 13/14*   (2006.01)
(52) U.S. Cl.
  USPC ...................................... 340/572.7; 340/10.1
(58) Field of Classification Search
  USPC ..................... 340/572.7, 10.1, 5.64
  See application file for complete search history.

(56) References Cited

U.S. PATENT DOCUMENTS

| | | | |
|---|---|---|---|
| 5,726,630 A | 3/1998 | Marsh et al. | |
| 2004/0227682 A1 | 11/2004 | Anderson | |
| 2008/0042847 A1* | 2/2008 | Hollister et al. | ........... 340/572.7 |
| 2008/0174432 A1 | 7/2008 | Ulrich | |

FOREIGN PATENT DOCUMENTS

| | | |
|---|---|---|
| DE | 102006034188 | 3/2007 |
| EP | 2216733 | 8/2010 |
| JP | 2003-283365 | 10/2003 |
| JP | 2006268695 | 10/2006 |
| JP | 2006-339759 | 12/2006 |
| JP | 2007088937 | 4/2007 |
| JP | 2007-128390 | 5/2007 |
| JP | 2008160433 | 7/2008 |
| WO | 2008/089374 | 7/2008 |
| WO | 2008/125346 | 10/2008 |

\* cited by examiner

*Primary Examiner* — Shirley Lu
(74) *Attorney, Agent, or Firm* — Lee, Hong, Degerman, Kang & Waimey

(57) ABSTRACT

Disclosed is an RFID-based reader configured to allow a UHF band RFID reader unit to recognize an RFID tag in a short distance, and to minimize an erroneous recognition, the reader including a gate frame discretely installed at both sides of an entrance and exit, a parabolic surface type reflective plate perpendicularly installed inside of the gate frame, an array antenna arranged on the reflective plate for receiving a tag information transmitted from an RFID tag, and an RFID reader unit for controlling an operation of the array antenna and converting the tag information received from the array antenna to a tag data.

4 Claims, 5 Drawing Sheets

READER BASED ON RFID

CROSS-REFERENCE TO RELATED APPLICATION

This application claims the benefit of the Korean Patent Application No. 10-2009-0102255, filed on Oct. 27, 2009, which is hereby incorporated by reference as if fully set forth herein.

FIELD OF THE DISCLOSURE

The present invention relates to an RFID reader, and more particularly to a reader based on RFID configured to recognize an object at a proximate distance in an RFID system of UHF band.

DISCUSSION OF THE RELATED ART

RFID (Radio Frequency IDentification) is a general term for a technology of processing information of items by using a compact semiconductor chip. More specifically, the RFID technology enables a non-contact recognition system which wirelessly transmits information of a product and peripheral information of the product using a compact chip, which is attached to a variety of products.

The RFID system basically includes an RFID tag for storing data, and an RFID reader capable of reading out data stored in the RFID tag. The RFID system may be categorized into several types, based on application, that is, a book management RFID, an input/output RFID, a product management RFID, a logistics/distribution RFID, a product management RFID and a warehouse product management RFID system.

In the book management RFID system, a tag recognizer (e.g., tag ID) is recorded on an RFID tag, and in a case the RFID tag approaches an RFID receiver, the tag recognizer stored in a relevant RFID tag is transmitted to the RFID receiver through an antenna formed at the RFID tag, whereby the RFID tag is recognized.

The RFID receiver is generally installed at a door of a relevant facility in order to block entrance and exit of books, products and/or people in a particular facility of a business place.

FIG. 1 is a schematic view illustrating a conventional RFID reader, where the RFID reader may include, but not limited to, a gate frame 10, a gate antenna 11 and a monitoring camera 15.

Referring to FIG. 1, the gate frame 10 is formed with an antenna 11 to recognize an object or people attached with an RFID tag 1. The gate frame 10 is additionally formed with a monitoring camera 15 to reinforce the RFID function. For example, the monitoring camera 15 can reinforce the monitoring effect by turning an object to an image and making a not-recognized RFID tag 1 data-based when the not-recognized RFID tag 1 passes the gate frame.

Although the product and book theft preventing system using the RFID system is mainly used in a high frequency band (13.56 MHz) up to now, the system is being gradually expanded to a UHF (860 MHz 960 MHz) band. That is, the RFID technology does not need to directly contact or scan an item within a visible band of a reader like in a barcode technology. Having such advantages, the RFID technology is considered as a replacement for a barcode technology, and an application range of the technology is expected to expand continuously.

For example, a low-frequency (30 kHz-500 kHz) RFID system is used for transmission in a short distance of less than 1.8 m, and a high-frequency (850 MHz-960 MHz) RFID system is used for transmission in a long distance of more than 5 m for overall social fields such as logistics, distribution, security, stock history management.

However, the recent trend is that an RFID short distance recognition is replacing an RFID long distance recognition as a burglar detecting system (BDS).

If an antenna installed at a BDS gate recognizes tags existing in a wide range of environment about the gate, there is a high likelihood of the system performing an erroneous operation. Therefore, the RFID gate antenna requires a technology of recognizing an RFID tag in a narrow area.

Currently, in the UHF (850 MHz-960 MHz) RFID system, there is no detailed standard or specification about the antenna configuration or function, and if a conventional single patch antenna is used for a UHF band RFID antenna, there may occur a disadvantage of increasing a radiating angle of electronic wave to unnecessarily recognize RFID tags that are located outside of a monitoring area.

SUMMARY OF THE DISCLOSURE

Accordingly, the present invention is directed to provide a reader based on RFID (hereinafter referred to as "RFID-based reader") configured to allow a UHF band RFID reader to recognize an RFID tag in a short distance, and to minimize an erroneous recognition.

Technical subjects to be solved by the present invention are not restricted to the above-mentioned description, and any other technical problems not mentioned so far will be clearly appreciated from the following description by the skilled in the art.

In one general aspect of the present invention, there is provided an RFID-based reader, the reader comprises: a gate frame discretely installed at both sides of an entrance and exit; a parabolic surface type reflective plate perpendicularly installed inside of the gate frame; an array antenna arranged on the reflective plate for receiving a tag information transmitted from an RFID tag; and an RFID reader unit for controlling an operation of the array antenna and converting the tag information received from the array antenna to a tag data.

In some exemplary embodiments of the present invention, the reflective plate may be provided in a parabolic surface type with a plurality of curvatures and be provided with antennas on a plain surface between the curvatures.

In some exemplary embodiments of the present invention, the reflective plate may be comprised of a plurality of blocks and installed lengthwise of the gate frame.

In some exemplary embodiments of the present invention, the reader further comprises a proximity sensor formed at the gate frame to detect an object approaching a gate; and a controller configured to control the operation of the RFID reader unit and to determine an in/out state of an RFID tag by analyzing tag data transmitted from the RFID reader unit, if the object is detected by the proximity sensor.

In some exemplary embodiments of the present invention, the array antenna may be configured in a plurality of small antennas, each small antenna being arranged on the reflective plate in a matrix type.

In some exemplary embodiments of the present invention, the plurality of small antennas may be sequentially operated by the RFID reader unit.

In some exemplary embodiments of the present invention, the proximity sensor may be one of an optical sensor, a high frequency oscillation type proximity sensor and an electric capacity proximity sensor.

ADVANTAGEOUS EFFECTS

The RFID-based reader according to the present invention has an advantageous effect in that a parabolic surface type reflective plate and an array antenna are used to enable a short distance recognition in recognizing an RFID tag, to minimize an erroneous recognizing operation, to lessen an interference from outside of a gate and to maximize a recognition rate inside the gate.

BRIEF DESCRIPTION OF THE DRAWINGS

The accompanying drawings, which are included to provide a further understanding of the present invention and are incorporated in and constitute a part of this application, and together with the description serve to explain the principle of the invention. In the drawings.

DETAILED DESCRIPTION

Figure 1:
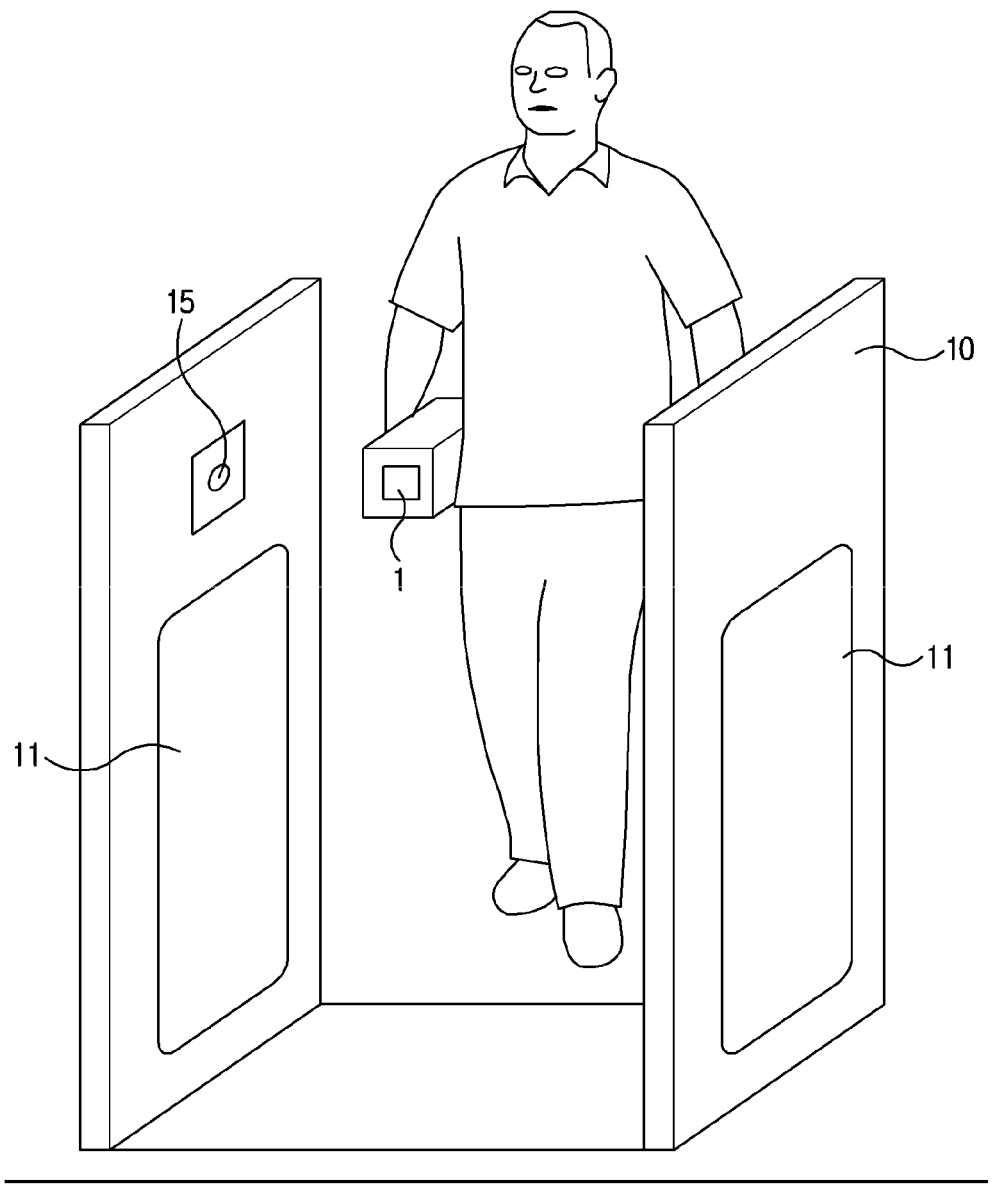
FIG. 1 is a conceptual view illustrating a conventional RFID gate reader unit according to prior art.

Hereinafter, implementations of the present invention are described in detail with reference to the accompanying drawings. Detailed descriptions of well-known functions, configurations or constructions are omitted for brevity and clarity so as not to obscure the description of the present invention with unnecessary detail.

The terminology used herein is for the purpose of describing particular implementations only and is not intended to be limiting of the invention. As used herein, the singular forms "a", "an" and "the" are intended to include the plural forms as well, unless the context clearly indicates otherwise.

Furthermore, the same reference numerals will be assigned to the same elements in the explanations of the figures, and explanations that duplicate one another will be omitted.

Figure 2:
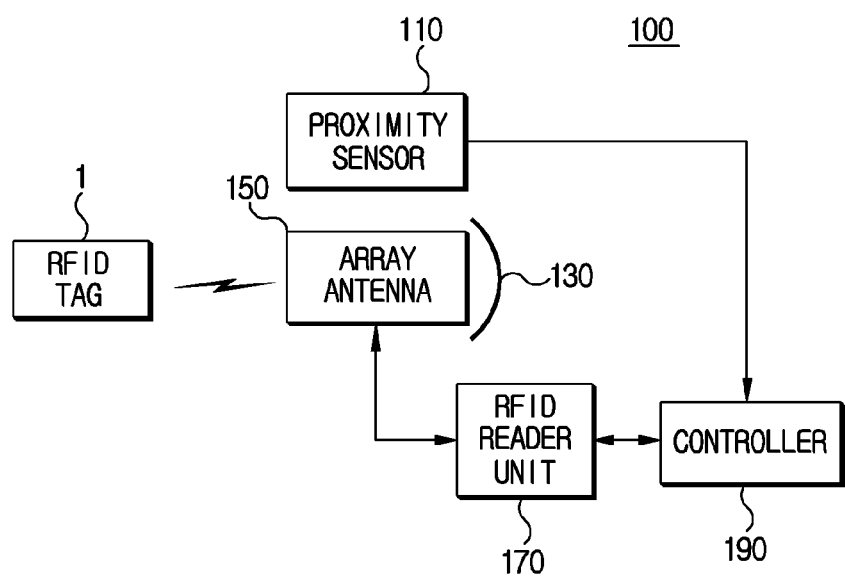
FIG. 2 is a functional block diagram illustrating an RFID-based reader according to the present invention.
Figure 3:
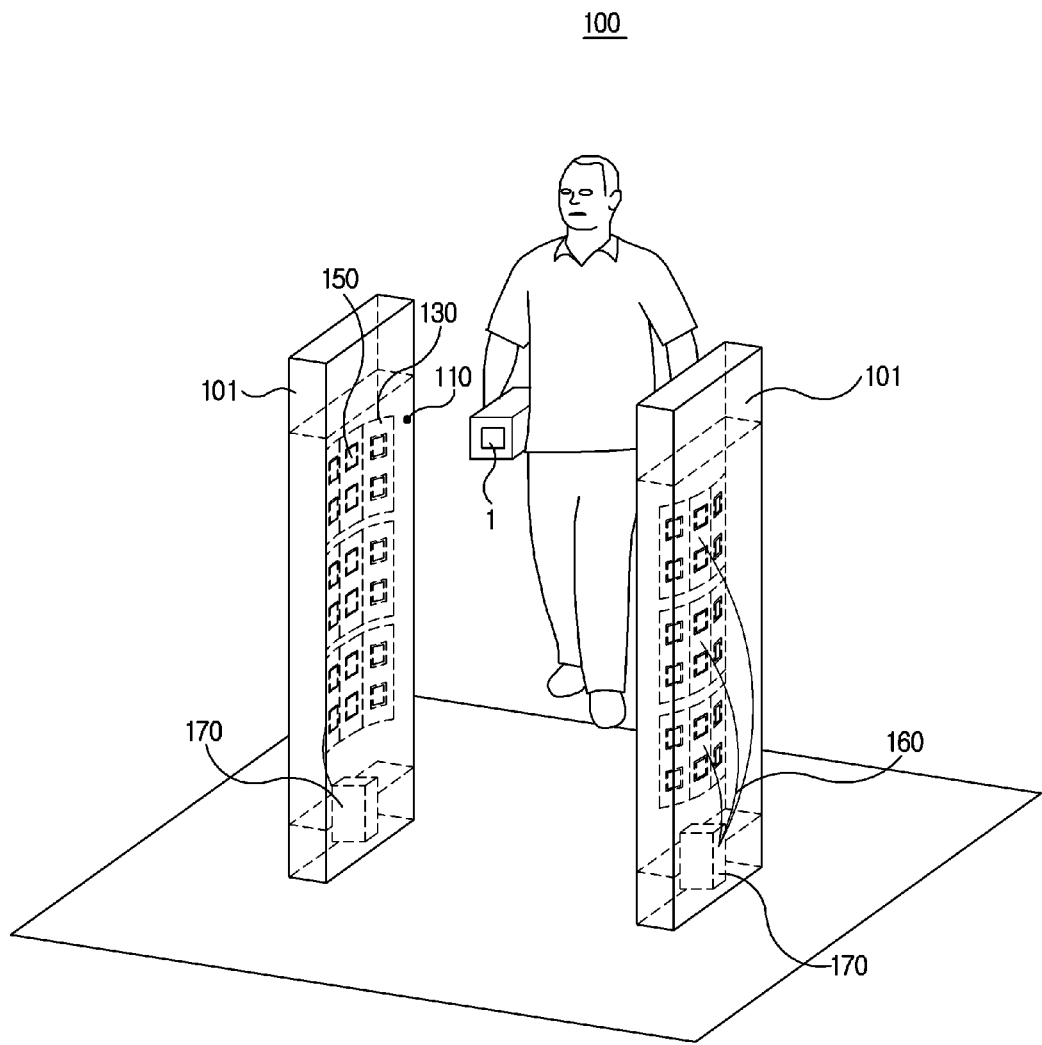
FIG. 3 is a schematic view illustrating an RFID-based reader according to an exemplary embodiment of the present invention.

FIG. 2 is a functional block diagram illustrating an RFID-based reader according to the present invention, and FIG. 3 is a schematic view illustrating an RFID-based reader according to an exemplary embodiment of the present invention, where a RFID-based reader 100 may include a gate frame 101, a proximity sensor 110, a reflective plate 130, an array antenna 150, an RFID reader unit 170 and a controller 190.

Referring to FIGS. 2 and 3, the gate frame 101 is discretely installed at both sides of an entrance and exit. The proximity sensor 110 is installed at the gate frame 101 to detect an object approaching a gate.

The proximity sensor 110 may include an optical sensor including a light emitting diode and a light receiving device, a high frequency oscillation type proximity sensor using electric induction phenomenon of detected object, and an electric capacity proximity sensor using electric capacity between the detected object and a ground.

The reflective plate 130 may be a parabolic surface type reflector perpendicularly installed inside the gate frame 101. The reflective plate 130 may be provided in one block, but in the present embodiment, the reflective plate is provided in a plurality of blocks and installed in a lengthwise direction of the gate frame 101.

The array antenna 150 may be configured in a plurality of small antennas, each distanced at a predetermined space apart, and each being arranged on the reflective plate 130 in a matrix type in order to reduce a beam width.

Although the present exemplary embodiment has explained that the array antenna 150 is arranged on the parabolic surface type of reflective plate 130, the embodiment is not limited thereto, and other embodiments may be also provided. For example, the array antenna 150 may be arranged on the gate frame 101 in a parabolic surface type without using the reflective plate.

In the present embodiment, each gate frame 101 is installed with three reflective plates 130, where each reflective plate 130 is installed with 4×2 numbers of small antennas 150. The array antenna 150 may be categorized in two types, based on the direction of tag, that is, a circularly polarized antenna and a linearly polarized antenna.

The RFID reader unit 170 is connected to the array antenna 150 installed on the reflective plate 130 via a cable 160 to control the operation of the array antenna 150, and converts tag information received by the array antenna 150 to tag data.

In a case an object is detected by the proximity sensor 110, the controller 190 controls the operation of the RFID reader unit 170 and analyzes the tag data transmitted from the RFID reader unit 170 to determine in/out status of RFID tag 1. The RFID reader unit 170 remains under a sleep mode in ordinary times, but is operated in response to control of the controller 190 only when an object or a man attached with the tag 1 approaches the gate.

As noted from the above, the RFID-based reader according to the present invention recognizes the tag 1 that passes the gate by attaching the small UFH band RFID antenna 150 to the gate frame 101.

In a case the gate is applied with the conventional antenna as shown in FIG. 1, there is a high likelihood of inducing an erroneous operation due to recognition of tags existing outside of a gate domain, because the beam width of antenna radiation pattern is wide. Therefore, in order to prevent the aforementioned disadvantage, the present invention is configured in such a manner that the array antenna is installed on the parabolic surface type reflective plate 130 to thereby prevent unnecessary recognition of tags outside of the gate domain.

Figure 4A:
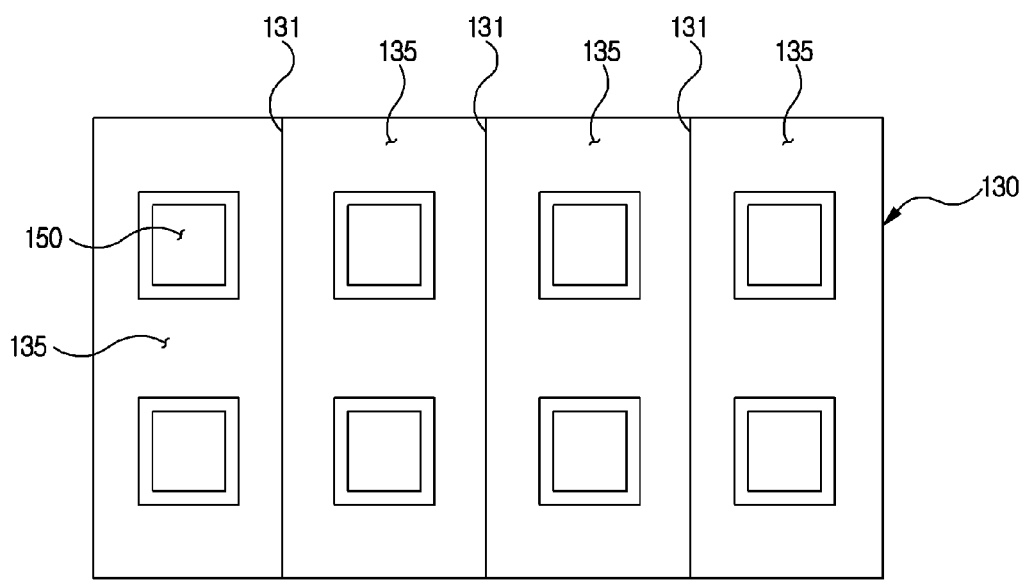
FIGS. 4a and 4b are front and plan views illustrating a reflective plate and an array antenna according to the present invention.
Figure 4B:
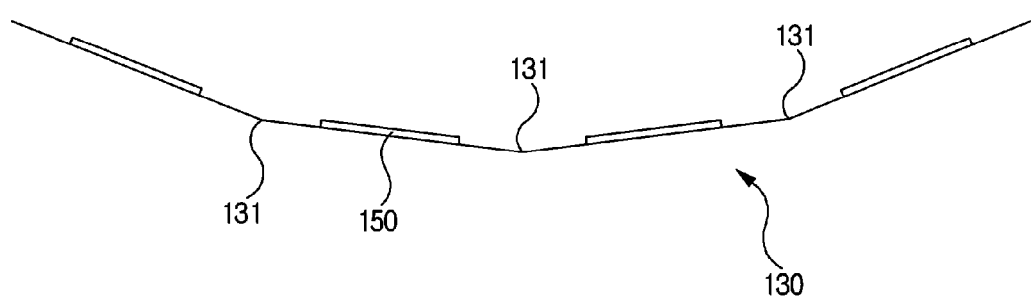

The reflective plate 130 and the array antenna 150 are configured in parabolic surface type as illustrated in front and plan views of FIGS. 4a and 4b.

Referring to FIGS. 4a and 4b, the reflective plate 130 is configured in the parabolic surface type having a plurality of curvatures 131, where a plain surface 135 between the curvatures 131 is arranged with a small antenna 150.

Figure 5:
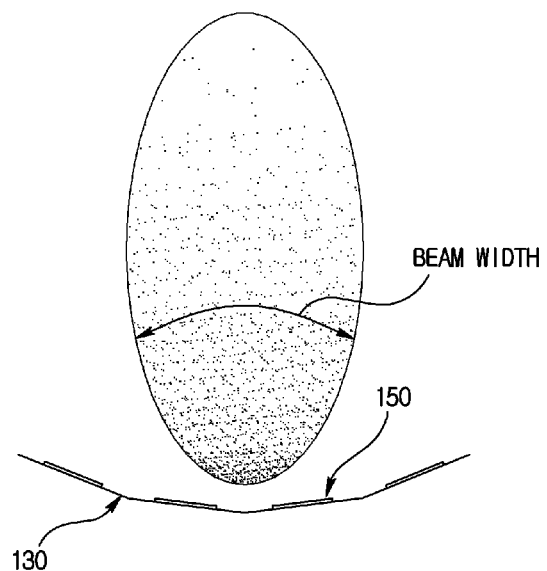
FIGS. 5 and 6 are schematic views of radiating patterns of beam according to the present invention.

Now, referring to FIG. 5, with application of the array antenna 150 to the present invention, the beam width becomes narrower to prevent the electronic wave radiated from the antennas from being radiated to the outside of the gate, such that RFID tags outside of the gate can be avoided from being recognized.

Figure 6:
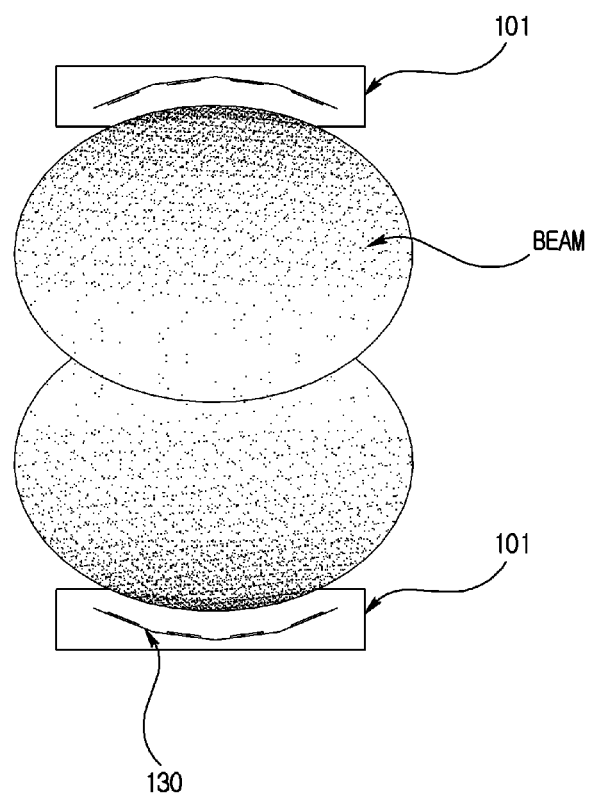

Furthermore, the electronic wave radiated from the mutually-facing array antennas 150 is reduced from going outside of the gate due to parabolic surface configuration of the reflective plate 130 as shown in FIG. 6, and as a result, a back-scattered tag signal of the tag 1 can be concentrated into the gate to enhance a tag recognition rate by the RFID reader unit 170.

The RFID-based reader thus configured is such that the gate frame 101 is embedded with a plurality of array antennas 150 and the RFID reader unit 170, where each RFID reader unit 170 embedded in each gate frame 101 is synchronized and prevented from simultaneously reading the tags only to be sequentially operated. If the tags 1 are simultaneously read by the RFID reader unit 170, there may occur interference between the RFID reader units 170 to decrease the recognition rate, from where it is necessary to read the tags sequentially.

Furthermore, the proximity sensor 110 is attached to a front surface of the gate, and in a case an object approaching the gate is detected by the proximity sensor 110, the controller 190 operates the sleep-mode RFID reader unit 170 to reduce unnecessary overload or power consumption by the RFID reader unit 170. Of course, the RFID reader unit 170 is operated until there is no response from the tags 1, and thereafter, the RFID reader unit 170 returns to the sleep mode.

The gate applied to the present invention is so structured as to increase a recognition rate inside the gate while reducing the interference from outside of the gate, whereby the short distance recognition function has been greatly reinforced. Therefore, the RFID-based reader according to the present invention is industrially applicable to a short distance (within 1~2 m) RFID system such as EAS (Electronic Article Surveillance) system using the RFID and BDS (Burglar Detecting System) in a library. It should be apparent that the present invention can be adequately applied to other gate fields.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents

What is claimed is:

1. A reader based on Radio Frequency Identification (RFID), the reader comprising:
    a gate frame discretely installed at both sides of an entrance and exit;
    a parabolic surface reflective plate perpendicularly installed inside of the gate frame;
    an array antenna arranged on the parabolic surface reflective plate for receiving tag information transmitted from an RFID tag;
    an RFID reader unit for controlling an operation of the array antenna and converting the tag information received from the array antenna to tag data;
    a proximity sensor formed at the gate frame to detect an object approaching a gate; and
    a controller configured to control operation of the RFID reader unit and to determine an in/out state of an RFID tag by analyzing the tag data transmitted from the RFID reader unit when the object is detected by the proximity sensor,
    wherein the parabolic surface reflective plate is provided in a parabolic surface with a plurality of curvatures and is provided with antennas on a plain surface between the curvatures, and
    wherein the array antenna includes a plurality of small antennas, each small antenna being arranged on the parabolic surface reflective plate in a matrix.

2. The reader of claim 1, wherein the parabolic surface reflective plate comprises a plurality of blocks and is installed lengthwise of the gate frame.

3. The reader of claim 1, wherein the plurality of small antennas is sequentially operated by the RFID reader unit.

4. The reader of claim 1, wherein the proximity sensor comprises an optical sensor, a high frequency oscillation proximity sensor or an electric capacity proximity sensor.

* * * * *